Nov. 20, 1928.　　　　　　　　　　　　　　1,692,547
M. EVANS
PORTABLE ELECTRIC COOKER
Filed Dec. 19, 1922

Inventor,
Morris Evans
By Vernon E. Hodges
his Atty.

Patented Nov. 20, 1928.

1,692,547

UNITED STATES PATENT OFFICE.

MORRIS EVANS, OF WASHINGTON, DISTRICT OF COLUMBIA.

PORTABLE ELECTRIC COOKER.

Application filed December 19, 1922. Serial No. 607,850.

My invention relates to an improvement in portable electric cookers.

The object, as the title implies, is to provide a cooker of portable nature that can be heated by electricity and used for cooking, heating, or keeping hot (like a fireless-cooker) any article of food, or in fact any article that requires heating and cooking.

This invention includes an outer wall made preferably in some artistic form or shape, a lining of asbestos to conserve and hold in the heat and prevent the outer wall from becoming hot, a heating-unit of refractory material with electric wires molded therein, and an inner wall, thus providing an enclosure for heating and cooking.

Figure 1:
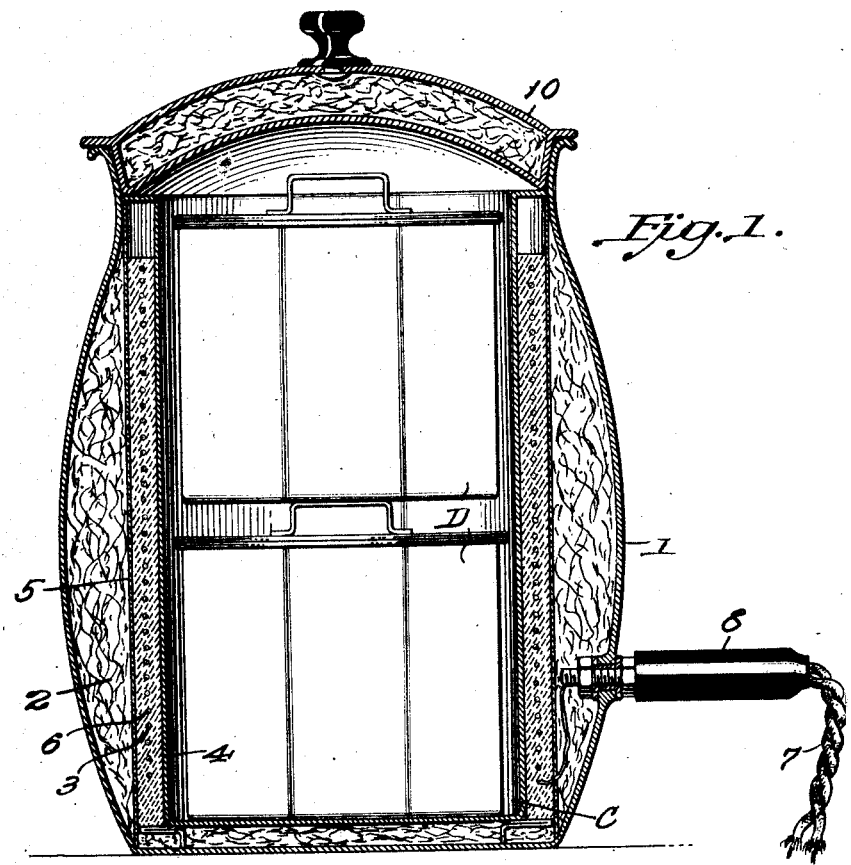
Fig. 1 is a section through the cooker.
Figure 2:
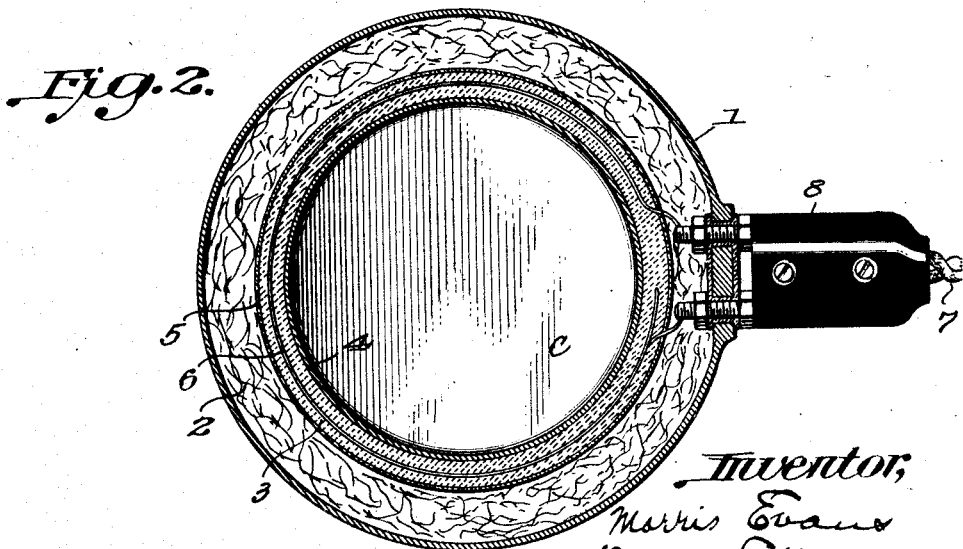
Fig. 2 is a horizontal section.

The numeral 1 represents the outer wall, which may be made of aluminum or other metal in suitable size and form both for utility and artistic effect. The numeral 2 indicates a lining of asbestos or other non-conducting or insulating material. The numeral 5 is a lining of mica to aid in further insulating the cooker. 4, is the inner wall; and 3 is a heating-unit of refractory material, preferably made of aluminum oxide and certain other chemicals and allowed to harden, and having the function of retaining the heat. In the center of the refractory material, the high tension electric wire 6 is molded. The numeral 7 indicates the conductor-wire; and 8, a plug. A cover 10 may be placed over the top when desired to retain the heat.

Within are the cooking-pans or dishes D, of which two or more may be placed therein at any time.

By means of this cooker or heater, any article of food can be easily, quickly and satisfactorily cooked or kept hot; and besides placing the containers inside of the heating chamber C, eggs, meat or other articles of food can be fried in a pan placed on top.

It is possible to heat the cooker quickly to a very high degree of heat, and in this way cooking may be quickly and satisfactorily done, at an expenditure of a trifling amount of current.

The heating-unit of refractory material can not only be heated to a red or white heat, but it is of a nature to hold the heat a long time, so that the cooker or heater can be used not only for cooking while the current is on, but also as a fireless-heater when the current is turned off.

Also other heat retaining elements might be employed, the aim being that when once the electricity has heated this element to a red hot point, the current of electricity may be switched off and the brick will remain at a red hot temperature, and the food will go on cooking just as long as it is retained and the cover is on, thus effecting a great saving of electricity and attendant expense.

With a device of the character specified, it is possible to percolate coffee, to bake, fry, boil, stew, toast, broil steaks, roast meats, fry eggs, steam, and in fact do anything that any other cooking stove, heater, or steamer will do.

I claim:

1. A portable electric cooker including outer and inner walls spaced apart around the sides and bottom and having an inner heating chamber within the inner wall, said inner wall being bent outwardly at the upper end thereof for closing the space between the outer and inner walls, insulating material interposed between the outer and inner walls, a heating unit of refractory material, having a wire of high resistance molded therein surrounding the inner wall for heating the inner chamber, a mica lining interposed between the heating unit and the insulating material, means for supporting the heating unit from the bottom of the outer wall, an electric plug connected with the side of the outer wall for supplying electric current to the resistance wire, and an insulated cover for the heating chamber.

2. A portable electric cooker including an inner and outer receptacle, the inner receptacle spaced apart from the outer receptacle along the walls and bottom, the inner receptacle being bent outwardly at the upper end thereof for closing the space between the outer and inner walls, insulating material interposed between the inner and outer walls, a heating unit of refractory material, having a wire of high resistance molded therein surrounding the inner wall for heating the inner chamber, a mica-lining interposed between the heating unit and the insulating material, substantially L-shaped members embedded in the bottom space for supporting the heating unit from the bottom of the outer receptacle, an electric plug connected with the side of the outer wall, and an insulated cover for the heating chamber.

In testimony whereof I affix my signature.

MORRIS EVANS.